US011916986B2

(12) United States Patent
Cohen et al.

(10) Patent No.: US 11,916,986 B2
(45) Date of Patent: *Feb. 27, 2024

(54) METHOD AND SYSTEM FOR PROVIDING ELASTIC MEDIA FORKING INFRASTRUCTURE TO CLOUD DISTRIBUTED REAL-TIME APPLICATIONS

(71) Applicant: NICE LTD., Ra'anana (IL)

(72) Inventors: Yaron Cohen, Modiin (IL); Ofir Mecayten, Karkur (IL)

(73) Assignee: NICE., LTD, Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/969,754

(22) Filed: Oct. 20, 2022

(65) Prior Publication Data

US 2023/0052029 A1 Feb. 16, 2023

Related U.S. Application Data

(63) Continuation of application No. 17/727,853, filed on Apr. 25, 2022, now Pat. No. 11,516,267, which is a continuation of application No. 17/381,206, filed on Jul. 21, 2021, now Pat. No. 11,343,297, which is a continuation of application No. 17/167,119, filed on Feb. 4, 2021, now Pat. No. 11,108,839.

(51) Int. Cl.
*G06F 15/16* (2006.01)
*H04L 65/60* (2022.01)
*H04L 65/1066* (2022.01)
*H04L 65/61* (2022.01)

(52) U.S. Cl.
CPC .......... *H04L 65/60* (2013.01); *H04L 65/1066* (2013.01); *H04L 65/61* (2022.05)

(58) Field of Classification Search
CPC .... H04L 65/61; H04L 65/764; H04L 41/0677
USPC ................................................. 709/203, 231
See application file for complete search history.

(56) References Cited

U.S. PATENT DOCUMENTS

| | | | | |
|---|---|---|---|---|
| 2002/0166117 A1* | 11/2002 | Abrams | ................ | H04L 41/147 717/177 |
| 2007/0258471 A1* | 11/2007 | Chu | ................... | H04L 41/5003 370/401 |
| 2016/0127536 A1* | 5/2016 | Jayapalan | ........... | H04L 63/1408 379/265.02 |
| 2016/0182288 A1* | 6/2016 | Mäenpää | ............ | H04L 41/0806 709/220 |

(Continued)

*Primary Examiner* — Duyen M Doan
(74) *Attorney, Agent, or Firm* — SOROKER AGMON NORDMAN RIBA

(57) ABSTRACT

A computerized-method for providing an elastic media forking infrastructure to cloud distributed real-time applications, is provided herein. In a network having a direct media streaming between a first media-client and a source device, in a direct media streaming mode, upon receiving a request from a second media-client, via a signaling protocol, to receive media from the source device, switching from the direct media streaming mode to a media forking mode by starting a media forking service on a media forking infrastructure. Upon receiving a request from the second media-client to terminate media reception from the source device, switching from media forking mode to direct streaming mode, by ending the media forking service, and operating the direct media streaming between the first media-client and the source device.

11 Claims, 3 Drawing Sheets

(56) References Cited

U.S. PATENT DOCUMENTS

2018/0242230 A1* 8/2018 Grinshpun ............ H04L 65/612

* cited by examiner

METHOD AND SYSTEM FOR PROVIDING ELASTIC MEDIA FORKING INFRASTRUCTURE TO CLOUD DISTRIBUTED REAL-TIME APPLICATIONS

RELATED APPLICATIONS

This application claims priority as a continuation from application Ser. No. 17/727,853 dated Apr. 25, 2022, which is a continuation from application Ser. No. 17/381,206 dated Jul. 21, 2021 which is a continuation from application Ser. No. 17/167,119 dated Feb. 4, 2021, the disclosure of which is incorporated herein by reference.

FIELD OF THE INVENTION

The present invention relates to media streaming, and more specifically to a method and system for cost effective and elastic media forking infrastructure, for cloud distributed real-time systems having multiple applications.

BACKGROUND OF THE INVENTION

Cloud-based contact center systems are communicating with on-premise environment to receive service from multiple real-time applications, via an Internet Protocol (IP) network. These applications are consuming media streams, such as audio and video, in real-time, from source Internet Protocol (IP) devices, such as Private Branch Exchange (PBX) device, Session Border controller (SBC) device and the like, which are associated to the contact center on-premise systems. The media streams, from the source IP devices, are delivered over IP networks to the cloud-based applications, by a network protocol, such as Real-time Transport Protocol (RTP).

Real-time sessions between the cloud-based applications and the source IP devices are initiated, maintained, modified and terminated by a signaling protocol, such as Session Initiation Protocol (SIP). The sessions are managed for media streaming by RTP between the source IP devices and cloud distributed real-time applications. For example, the cloud distributed real-time applications may provide recording services, monitoring services, Workforce Engagement and Optimization (WEM) services and Real-Time (RT) interaction analytics services and other services.

In order for a cloud-based system, such as the cloud-based contact center system to be able to provide in real-time and simultaneously several services, from the multiple cloud distributed real-time applications for the on-premise interactions, there is a need to stream the media from each one of the IP devices, which are associated to the on-premise domain to the one or more applications in the cloud domain.

In other words, each source IP device that is streaming media, for example when conducting an interaction between an agent and a customer, may need to stream media to a couple of cloud distributed real-time applications. For example, a media stream, such as the content of an interaction between an agent and a customer in a contact center, via an IP device may be recorded in real-time by a recording application in the cloud computing environment, where at the beginning of the interaction there may be also a need to authenticate the customer by an authentication application that is also in the cloud computing environment. The authentication application should receive the media stream from the IP device at the same time with the recording application. For that purpose, there is a need to fork the media stream from the source IP device, that is associated to the contact center systems, to the cloud distributed real-time applications, which are in the cloud computing environment.

Currently, there are source IP devices, which are capable of forking the media stream to a number of media streams, however they are limited in the number of streams that they may fork. Moreover, these source IP devices might be expensive and thus may impose high costs on the contact center. Furthermore, media forking is usually license based; and lastly, the media forking itself incurs high network bandwidth cost and therefore to reduce network costs the media forking would rather be forked as far as possible from the source IP devices and as close as possible to the cloud distributed real-time applications.

These deficiencies may be solved by existing architecture for implementing a media forking infrastructure, such as a standard Selective Forwarding Unit (SFU), which is capable of receiving multiple media streams and then decide which of these media streams should be sent to which participants. However, the existing architecture may not be scalable, as will be explained in detail in FIG. 1 below, and also in practice, many media streaming include only a single media client, e.g., recorder, RT analytics, authentication application and the like, for most of the interaction duration, which makes the media forking necessary, only during part of the interaction and redundant during the other part. In other words, when using existing architecture, a media forking infrastructure may be activated even though the media stream is not forked and the media forking services are not provided, thus affecting the quality of the media stream and wasting computing and network bandwidth resources.

Accordingly, there is a need for a technical solution that will provide an elastic media forking infrastructure to cloud distributed real-time applications and a dynamic control of media stream routing with respect to the number of media clients and support of additional clients, without impacting the already existing media streams quality.

There is further a need for a media forking infrastructure solution, that will allow dynamically change of the media routing mode, from direct media streaming to media forking and vice versa, thus protecting the quality of the media stream and saving media forking infrastructure resources by providing an elastic media forking infrastructure, i.e., activating and deactivating, the media forking infrastructure.

SUMMARY OF THE INVENTION

There is thus provided, in accordance with some embodiments of the present invention, a computerized-method for providing an elastic media forking infrastructure to cloud distributed real-time applications.

Furthermore, in accordance with some embodiments of the present invention, in an Internet Protocol (IP) network that is having a direct media streaming between a first media client and a source IP device, in a direct media streaming mode, upon receiving a request from a second media client, via a signaling protocol, to receive media from the source IP device, the computerized-method may switch from the direct media streaming mode to a media forking mode by starting a media forking service on a media forking infrastructure.

Furthermore, in accordance with some embodiments of the present invention, upon receiving a request from the second media client to terminate media reception from the source IP device, the computerized-method may switch from media forking mode to direct streaming mode, by ending the media forking service, and operating the direct media streaming between the first media client and the source IP device, thus, providing an elastic media forking infrastructure and saving media forking infrastructure resources.

Furthermore, in accordance with some embodiments of the present invention, the media forking service is forking media received from the source IP device and transmitting the received media to the first media client and to the second media client.

Furthermore, in accordance with some embodiments of the present invention, the direct media streaming may include having the first media client directly receiving media from the source IP device.

Furthermore, in accordance with some embodiments of the present invention, the request from the second media client to receive media from the source IP device may be a join message of the signaling protocol.

Furthermore, in accordance with some embodiments of the present invention, the media forking infrastructure is available to provide media forking service when switching from the direct media streaming mode to a media forking mode.

Furthermore, in accordance with some embodiments of the present invention, the media forking infrastructure may have a capacity to provide media forking service to a predetermined quantity of source IP devices and when the media forking infrastructure may operate in full capacity and an additional switching from a direct media streaming mode to a media forking mode may be required by an additional source IP device, an additional media forking infrastructure may be activated and added to the IP network and a new media forking service node may be started on the additional media forking infrastructure.

Furthermore, in accordance with some embodiments of the present invention, upon receiving a request from a second media client to terminate media reception from the additional source IP device, the computerized-method may be (i) ending the new media forking service; (ii) operating a direct media streaming between a first media client and the additional source IP device; and (iii) deactivating the additional media forking infrastructure when no media forking service is provided by it.

Furthermore, in accordance with some embodiments of the present invention, when there is a media forking service running on the media forking infrastructure, upon a new requirement to switch from a direct media streaming mode to a media forking mode, the computerized-method may be checking if the media forking infrastructure is available to start an additional media forking service.

Furthermore, in accordance with some embodiments of the present invention, switching between the media forking mode to the direct streaming mode and vice versa may result in a media loss which does not deteriorate media quality.

Furthermore, in accordance with some embodiments of the present invention, the source IP device may be associated to an on-premise system of a cloud-based contact center, and the first media client and the second media client may be cloud distributed real-time applications.

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION OF THE INVENTION

Figure 1:
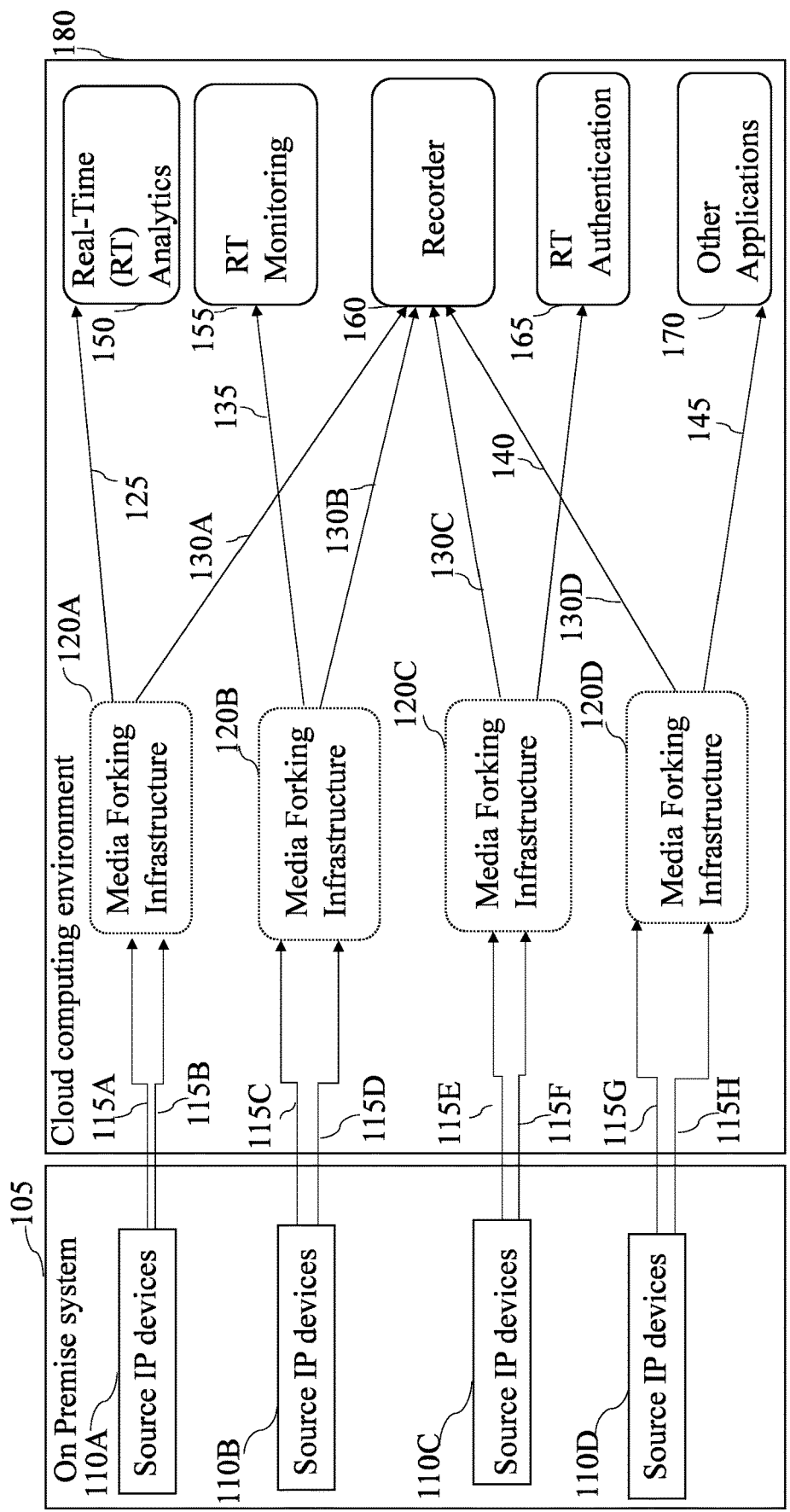
FIG. 1 is a block diagram of an example of existing architecture for media stream forking of a single media stream from source IP devices to cloud based applications.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

Existing architecture that implements media forking infrastructure, is having one or more units, such as a standard Selective Forwarding Unit (SFU). Each unit may provide a media forking service to a limited number of source IP devices. The implementation may use any process scheduler, such as round-robin algorithm, but for the simplicity of the explanation of existing architecture deficiencies, this concept is not included.

Each source IP device may forward a single media stream to two or more media clients in a cloud computing environment by using a media forking service provided by the media forking infrastructure. However, during media streaming between a source IP device and multiple media clients, not all the media clients consume the media stream and most of the time only one media client requires the media stream. It means that a portion of media forking infrastructure resources, may be redundant and a direct media streaming may be implemented Accordingly, the embodiments taught herein, in contrast to existing architecture, protect the media stream quality and improve the savings of media forking infrastructure resources, e.g., computing resources, in a cloud computing environment. The improvement may be achieved by ending media forking service after the media client terminates the reception of media streaming and deactivating the media forking infrastructure when it does not provide any media forking services to any active source IP device. In other words, the embodiments taught herein in contrast to existing architecture may be switching from media forking mode to direct media mode.

Thus, after all media forking services of a media forking infrastructure are ended, the embodiments taught herein may deactivate the media forking infrastructure, and thus saving computing sources of the cloud computing environment. Moreover, the switching from media forking mode to direct media streaming mode may save network bandwidth and protect the media stream quality that is affected by the media forking service.

FIG. 1 is a block diagram of an example of existing architecture for media stream forking of a single media stream from source IP devices to cloud-based applications.

In an on-premise system of a contact center, source Internet Protocol (IP) devices, such as source IP devices 110A-110D, may stream media to one or more real-time applications, such as Real-Time (RT) analytics 150, RT monitoring 155, recorder 160 RT authentication 165 and other applications 170, in a cloud computing environment 180.

Upon a computer Telephony Integration (CTI) event from a server such as a Telephony-server (T-Server) an application, e.g., a media client, may require a media stream from one of the source IP devices 110A-110D, and the media stream may be provided by a direct media stream. However, when more than one media client may receive a notification to consume the media stream from a source IP device, a media forking infrastructure, such as media forking infrastructure 120A-120D, may be implemented.

For example, to accommodate a business requirement of a contact center to record by a recording application in a cloud environment, each interaction between an agent and a customer, that is operated by a source IP device, and to analyze, in real-time, a portion of the interaction for business section customers, the following architecture may be implemented. A media forking infrastructure, such as media forking infrastructure 120A-120D, which can provide up to a predetermined media forking services, e.g., two media forking services for two active source IP devices, such as source IP devices 110A, each source IP device may stream a single media stream per interaction 115A or 115B to media forking infrastructure 120A. The media forking infrastructure 120A, may fork the single media stream to an RT analytics application 150 and to a recorder application 160 in the cloud computing environment 180, during the entire interaction, i.e. media streaming.

When a third source IP device begins an interaction, i.e., a third source IP device is active, and for example requires recording services from recorder 160 and RT monitoring from RT monitoring 155, media forking infrastructure 120A cannot provide a media forking service, because it is in full capacity, providing media forking services to active source IP devices 110A. Accordingly, a second media forking infrastructure 120B may be activated in the cloud environment to fork a single media stream 115C to media streams 135 and 130B.

At this point, when media forking infrastructure 120B has been activated for the third active source IP device, only recorder 160 may consume the media stream from source IP devices 110A. Thus, making the activation of media forking infrastructure 120B a waste of computing resources and network bandwidth which may also deteriorate the quality of the media stream received by the media clients in the cloud-based environment. In this example, a media forking infrastructure may provide media forking services to up to two source IP devices, e.g., source IP devices 110B, which may stream a single media stream 115c or 115D to media forking infrastructure 120B.

When a fifth source IP device starts an interaction, i.e., a fifth source IP device is active, while the four other interactions haven't ended yet, i.e., the four IP source devices are still active and streaming media and the fifth active source IP device may require, according to business logics, recording services by a recorder application 160 and an authentication of the customer at the beginning of the interactions by an RT authentication application 165, a third media forking infrastructure, such as media forking infrastructure 120C may be activated.

However, while media forking infrastructure 120C is activated, two or more of source IP devices 110A-110B may be required to transmit the media stream only to recorder application 160, i.e. only a single media stream is needed. Thus, again computing resources and network bandwidth may be wasted, which may also deteriorate the quality of the media stream received by the media clients in the cloud-based environment because the media streaming between source IP devices 110A-110B is operated via a media forking infrastructure 120A-120B instead of in direct media mode, e.g., not via the media forking infrastructure 120A-120B. Therefore, the fifth active source IP device could have been provided a media forking service by one of media forking infrastructures 120A-120B, instead of activating media forking infrastructure 120C.

When an interaction between an agent and a customer begins via a seventh source IP device e.g., with a VIP customer, and business logics requires that VIP customers are recorded by recorder 160 and also handled by other applications 170, a single media stream 115G or 115H, should be forked by a media forking infrastructure. But when all six interactions i.e. media streams are still going and media forking infrastructures 120A-120C are still activated, even though forking of the media stream is no longer required, media forking infrastructure 120D may be activated.

However, the activation of media forking infrastructure 120D may a waste of computing resources and network bandwidth which could have been saved if media streams that don't require media forking would be streamed in a direct media streaming mode and not via a media forking infrastructure. Moreover, in direct media streaming the quality of media stream that arrives at the media client wouldn't be deteriorated as it might when it is forked by media forking infrastructure.

Therefore, there is a need for a computerized-method and computerized system for providing an elastic media forking infrastructure to cloud distributed real-time applications.

Figure 2:
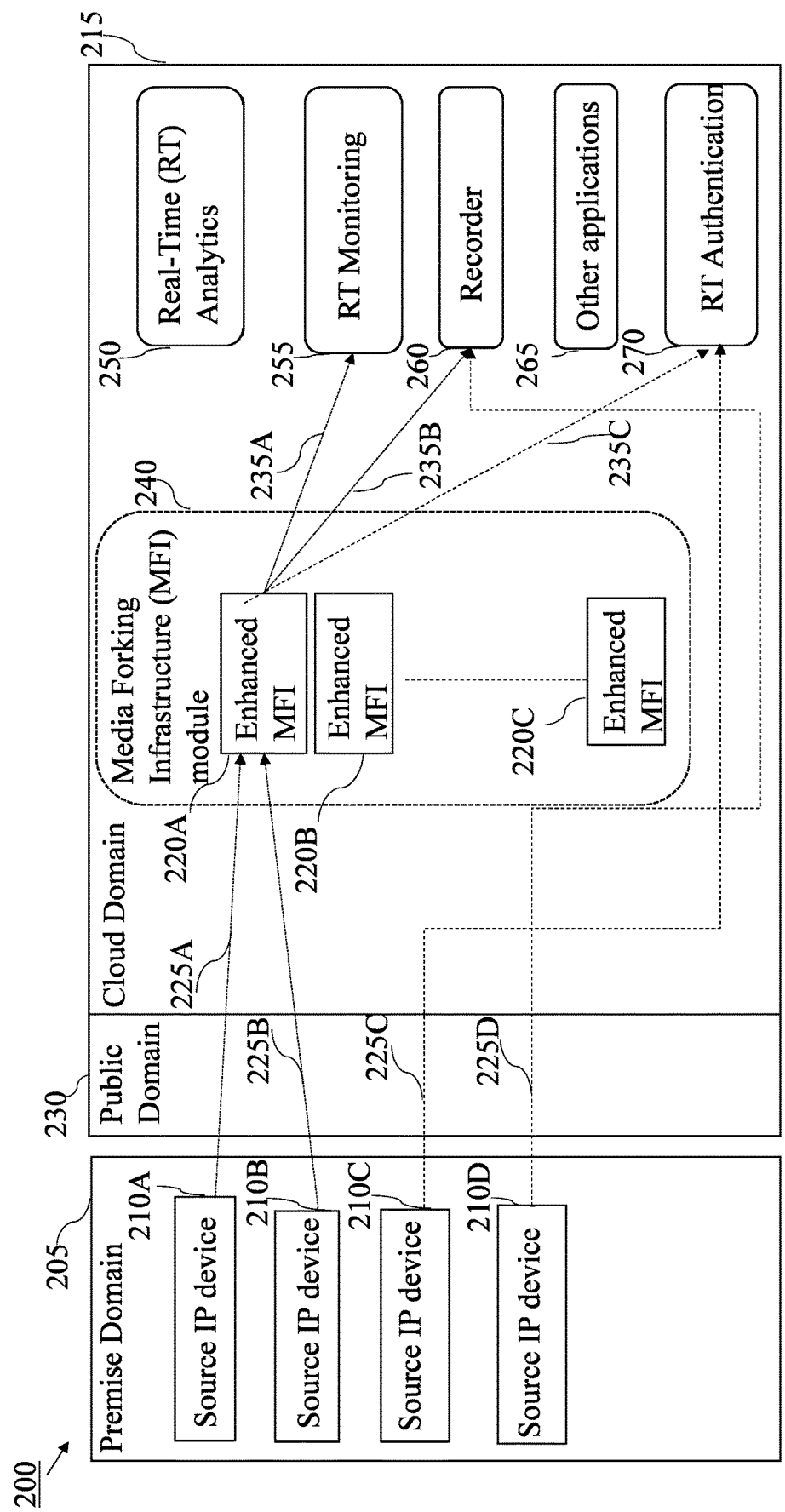
FIG. 2 is a block diagram illustrating for providing an elastic media forking infrastructure to cloud distributed real-time applications, in accordance with some embodiments of the present invention.

FIG. 2 is a block diagram illustrating a system 200 for providing an elastic media forking infrastructure to cloud distributed real-time applications, in accordance with some embodiments of the present invention.

According to some embodiments of the present disclosure, system 200 may include one or more source IP devices, such as source IP devices 210A-210D, associated to on-premise domain 205. Upon a computer Telephony Integration (CTI) event from a server, such as a Telephony-server (T-Server), media clients, such as cloud distributed real-time applications in a cloud domain, such as cloud domain 215, may receive a notification to consume data streams from source IP devices in the premise domain 205, via Internet Protocol (IP) network in the public domain 230.

According to some embodiments of the present disclosure, the media stream from source IP device, such as source IP devices 210A-210D, may not be limited to media stream of an interaction between a customer and an agent in a contact center that is streamed to applications in the cloud domain. The source IP device, such as source IP devices 210A-210D, in on-premise domain 205, may stream media to any one or more applications in a cloud domain, via public domain 230.

According to some embodiments of the present disclosure, the cloud distributed real-time applications in a cloud domain, such as cloud domain 215 may be for example, Real-Time (RT) analytics, which may analyze in real-time the content of an interaction between a customer and an agent, that is conducted by a source IP device such as source IP devices 210A-210D, in an on-premise domain 205. In another example, the application may be RT monitoring, such as RT monitoring application 255, which may monitor interactions in a contact center, for quality purposes.

In yet another example, an interaction between an agent and a customer that is conducted via a source IP device, such as source IP device 210A in an on-premise domain 205 may be recorded by a recorder application 260. The customer may be authenticated via an RT authentication application, such as RT authentication 270, at the beginning of the interaction. Other applications may be also required to be operated according to business logics at the beginning, during or at the end of an interaction that is conducted via a source IP device that is associated to the on-premise domain.

According to some embodiments of the present disclosure, upon a CTI event a media client, such as media client 250-270 may join a session with the MFI by a signaling protocol, such as Session Initiation Protocol (SIP) to receive a media stream from a source IP device, such as source IP device 210A, via a Media Forking Infrastructure (MFI) module, such as the MFI module 240. Accordingly, the source IP device may initiate a SIP session with the MFI module 240. Meaning, the MFI module 240 is a back-to-back SIP server which maintains a SIP session with the source IP devices and with the media clients for the media streaming which is operated by an RTP.

Accordingly, when the media client is the only application that is consuming media from the source IP device, then the MFI module, such as MFI module 240, may decide that a direct media streaming by RTP should be obtained in a direct media streaming mode between the source IP device and the media client. The direct media stream by RTP may not be operated via the MFI module 240.

Figure 3:
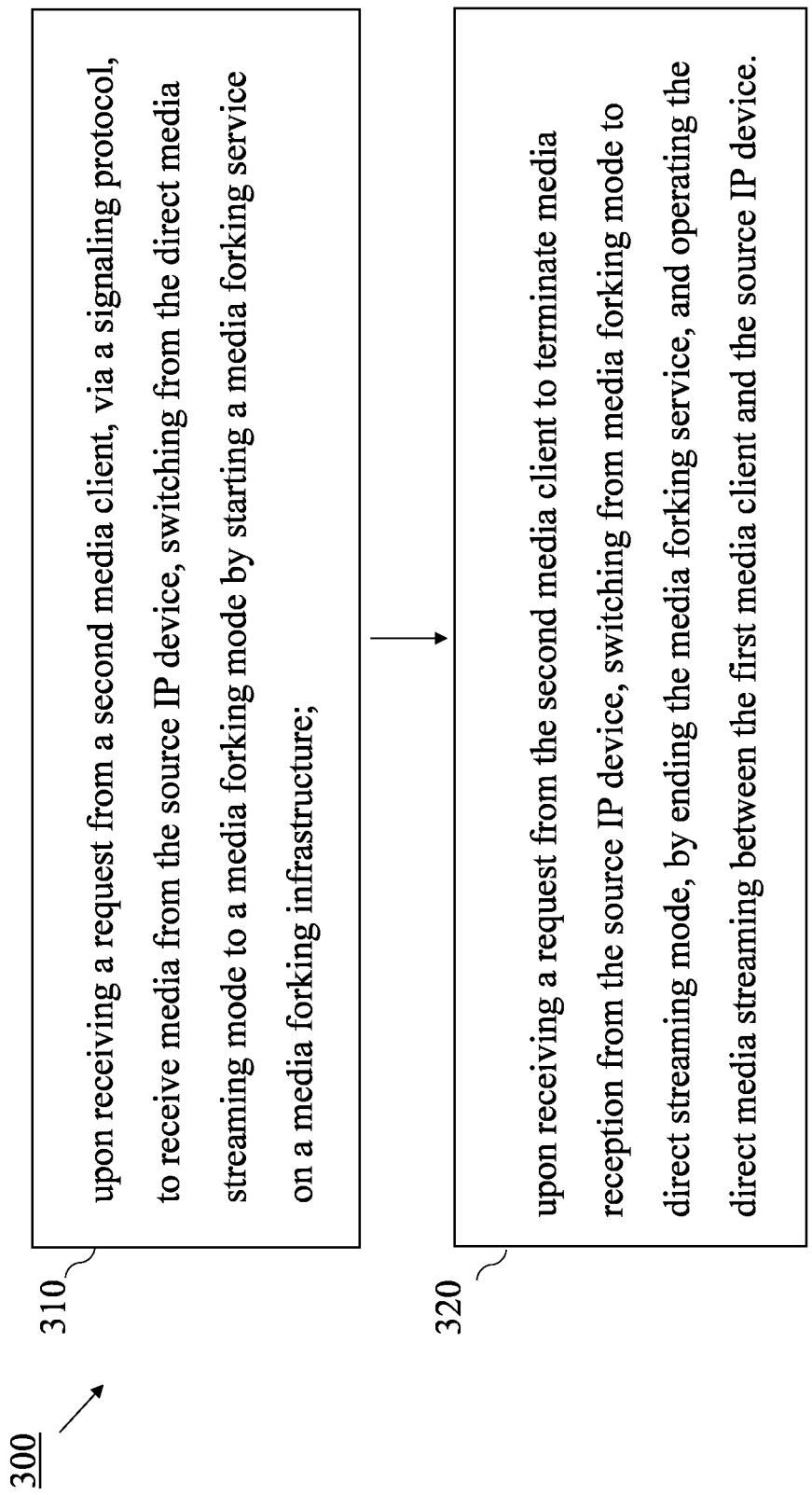
FIG. 3 is a flowchart illustrating a computerized-method for providing an elastic media forking infrastructure to cloud distributed real-time applications, in accordance with some embodiments of the present invention.

According to some embodiments of the present disclosure, MFI module, such as MFI module 240, may implement a computerized method, such as computerized-method 300 in FIG. 3 for providing an elastic media forking infrastructure to cloud distributed real-time applications.

According to some embodiments of the present disclosure, after a session has been initiated between a source IP device, such as source IP device 210A and the MFI module 240 to stream media to a media client in the cloud domain, such as cloud domain 215, another application in the cloud domain, may receive a notification to consume the media stream from the IP source device 210A, in addition to the recorder application 260, from MFI module 240.

According to some embodiments of the present disclosure, when a request to receive the media stream from a source IP device, such as source IP device 210A, that is already streaming media to a media client, the MFI module 240 may check if an enhanced MFI, such as enhanced MFI 220A, should be activated to provide media forking service.

According to some embodiments of the present disclosure, enhanced MFI, such as enhanced MFI 220A, may be activated to fork a media stream, such as media stream 225A, from source IP device 210A to media clients, such as RT monitoring 255 by media stream 235A and to recorder 260, via media stream 235B.

According to some embodiments of the present disclosure, an enhanced MFI, such as enhanced MFI 220A, may be available to provide media forking service when media stream from source IP device 210A is switching from the direct media streaming mode to a media forking mode.

According to some embodiments of the present disclosure, when a third media client, such as RT authentication 270, may request from MFI module 240 to consume the media stream from a source IP device, such as source IP device 210A, the MFI module 240 may fork media stream 225A received from source IP device 210A to RT monitoring 255, recorder 260 and RT authentication 270, via media streams 235A-235C.

According to some embodiments of the present disclosure, the request from the media clients to receive media from the source IP device may be a join message of the signaling protocol.

According to some embodiments of the present disclosure, each media forking infrastructure node, such as enhanced MFI 220A-220C, may have a capacity to provide media forking service to a predetermined quantity of source IP devices and when the media forking infrastructure may be operating in full capacity and an additional switching from a direct media streaming mode to a media forking mode may be required by an additional source IP device, an additional enhanced MFI, such enhanced MFI 220B may be activated and added to the IP network and a new media forking service may be started on the additional enhanced MFI.

According to some embodiments of the present disclosure, for example, when MFI module 240 may be required to stream media from source IP device 210B to more than one media client, MFI module 240 may check if enhanced MFI 220A is available to provide media forking service.

According to some embodiments of the present disclosure, upon receiving a request from a media client by the MFI module, such as MFI module 240 to terminate media reception from the additional source IP device, the MFI module, such as MFI module 240 and such as computerized method 300 in FIG. 3, may be (i) ending the new media forking service; (ii) operating a direct media streaming between a first media client and the additional source IP device; and (iii) deactivating the additional media forking infrastructure when no media forking service is provided by it.

According to some embodiments of the present disclosure, when there is a media forking service running on the media forking infrastructure, such as enhanced MFI 220A, upon a new requirement to switch from a direct media streaming mode to a media forking mode, the MFI module 240 may be checking if the media forking infrastructure is available to start an additional media forking service.

According to some embodiments of the present disclosure, the switching between the media forking mode to the direct streaming mode and vice versa, may result in a media loss which does not deteriorate media quality approximate time gap of 40 milliseconds.

According to some embodiments of the present disclosure, source IP device, such as source IP device 210C and source IP device 210D may be streaming media in a direct mode over a single media stream 225C and 225D respectively.

According to some embodiments of the present disclosure, the direct media mode may be before the switch to forking media mode or after. It may be operated when the MFI module 240 has detected that there is no need in media forking service.

According to some embodiments of the present disclosure, the MFI module 240 may be utilizing a database (not shown) to track media streaming for each source IP device that is streaming media to one or more applications in the cloud domain.

FIG. 3 is a flowchart illustrating a computerized-method 300 for providing an elastic media forking infrastructure to cloud distributed real-time applications, in accordance with some embodiments of the present invention.

According to some embodiments of the present disclosure, in an Internet Protocol (IP) network that is having a direct media streaming between a first media client, such as recorder 260 in FIG. 2 or RT authentication 270 in FIG. 2 and a source IP device, such as source IP device 210C in FIG. 2 or such as source IP device 210D in FIG. 2, in a direct media streaming mode, such as via single media streaming 225C or 225D respectively, operation 310 may comprise, upon receiving a request from a second media client, via a signaling protocol, to receive media from the source IP device, switching from the direct media streaming mode to a media forking mode by starting a media forking service on a media forking infrastructure.

According to some embodiments of the present disclosure, the computerized-method 300 such as, MFI module 240 in FIG. 2, may switch from the direct streaming mode to a media forking mode by checking if there is an enhanced MFI, such as enhanced MFI 220A available to provide media forking service. When the enhanced MFI, such as enhanced MFI 220A is not in full capacity, then computerized-method 300 for providing an elastic media forking infrastructure to cloud distributed real-time applications, such as MFI module 240 in FIG. 2, may fork the media stream, such as media stream 225A in FIG. 2 from source IP device, such as source IP device 210A to two media clients, such as recorder 260 in FIG. 2 and RT monitoring 255 in FIG. 2.

According to some embodiments of the present disclosure, operation 320 may comprise, upon receiving a request from the second media client to terminate media reception from the source IP device, switching from media forking mode to direct streaming mode, by ending the media forking service, and operating the direct media streaming between the first media client and the source IP device.

According to some embodiments of the present disclosure, for example, one of the two media clients may request to terminate media reception from source IP device 210A. Accordingly, the computerized-method 300 may switch from media forking mode to direct streaming mode. In case enhanced MFI, such as enhanced MFI 220A is not providing any media forking services to any IP source device associated to the on-premise domain, such as premise domain 205 in FIG. 2, MFI module 240 in FIG. 2, may deactivate the media forking infrastructure, such as enhanced MFI 220A.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A computerized-method for providing an elastic media forking infrastructure to cloud distributed real-time applications, in a cloud computing environment, the computerized-method comprising:

in a network that is having a direct media streaming between a first media client in the cloud computing environment and a source device, obtaining a direct media streaming mode between the first media client and the source device, by a Media Forking Infrastructure (MFI) module that is operating on a server in the cloud computing environment, upon receiving by the source device via the MFI module, a first request from a second media client in the cloud computing environment, via a signaling protocol, to receive media from the source device, switching by the MFI module from the direct media streaming mode to a media forking mode by starting a media forking service on the media forking infrastructure module, in the cloud computing environment.

2. The computerized-method of claim 1, wherein upon receiving a second request from the second media client to terminate media reception from the source device, switching from the media forking mode to the direct streaming mode, by ending the media forking service, and operating the direct media streaming between the first media client and the source device.

3. The computerized-method of claim 1, wherein the media forking service is forking media received from the source device and transmitting the received media to the first media client and to the second media client.

4. The computerized-method of claim 1, wherein the direct media streaming comprising having the first media client directly receiving media from the source device.

5. The computerized-method of claim 1, wherein the request from the second media client to receive media from the source device is a join message of the signaling protocol to the media forking infrastructure module.

6. The computerized-method of claim 1, wherein said media forking infrastructure module is available to provide media forking service when switching from the direct media streaming mode to the media forking mode.

7. The computerized-method of claim 1, wherein the media forking infrastructure module is having a capacity to provide the media forking service to a predetermined quantity of source devices and when the media forking infrastructure module is operating in full capacity and an additional switching from the direct media streaming mode to the media forking mode is required by an additional source device, an additional media forking infrastructure module is activated and added to the network and a new media forking service is started on the additional media forking infrastructure module.

8. The computerized-method of claim 7, wherein upon receiving the request from the second media client to terminate media reception from the additional source device: (i) ending the new media forking service; (ii) operating the direct media streaming between the first media client and the additional source device; and (iii) deactivating the additional media forking infrastructure module when no media forking service is provided by it.

9. The computerized-method of claim 1, wherein when the media forking service is running on the media forking infrastructure module, upon a new requirement to switch from the direct media streaming mode to the media forking mode, checking if the media forking infrastructure module is available to start an additional media forking service.

10. The computerized-method of claim 2, wherein switching between the media forking mode to the direct streaming mode and vice versa results in a media loss which does not deteriorate media quality.

11. The computerized-method of claim 1, wherein the source device is associated to an on-premise system of a cloud-based contact center, and wherein the first media client and the second media client are cloud distributed real-time applications.

* * * * *